US008508904B2

(12) United States Patent
Zimmermann

(10) Patent No.: US 8,508,904 B2
(45) Date of Patent: Aug. 13, 2013

(54) SURGE ARRESTER

(75) Inventor: Gero Zimmermann, Neuenhof (CH)

(73) Assignee: EPCOS AG, Munich (DE)

( * ) Notice: Subject to any disclaimer, the term of this patent is extended or adjusted under 35 U.S.C. 154(b) by 58 days.

(21) Appl. No.: 13/194,256

(22) Filed: Jul. 29, 2011

(65) Prior Publication Data

US 2012/0014029 A1 Jan. 19, 2012

Related U.S. Application Data

(63) Continuation of application No. PCT/EP2010/050864, filed on Jan. 26, 2010.

(30) Foreign Application Priority Data

Jan. 29, 2009 (DE) ........................ 10 2009 006 543

(51) Int. Cl.
*H02H 9/00* (2006.01)

(52) U.S. Cl.
USPC .......................................................... 361/118

(58) Field of Classification Search
USPC .......................................................... 361/118
See application file for complete search history.

(56) References Cited

U.S. PATENT DOCUMENTS

| | | | | |
|---|---|---|---|---|
| 3,979,646 | A | 9/1976 | Peche et al. | |
| 4,287,548 | A | 9/1981 | Hahndorff | |
| 4,686,603 | A * | 8/1987 | Mosele | 361/118 |

FOREIGN PATENT DOCUMENTS

| | | | |
|---|---|---|---|
| DE | 24 31 236 | A1 | 1/1976 |
| DE | 26 41 514 | A1 | 3/1978 |
| DE | 28 34 088 | A1 | 2/1980 |
| FR | 2 432 763 | A1 | 2/1980 |
| JP | 2006-244794 | A | 9/2006 |

* cited by examiner

*Primary Examiner* — Stephen W Jackson
(74) *Attorney, Agent, or Firm* — Slater & Matsil, L.L.P.

(57) ABSTRACT

A surge arrester includes a housing with a tubular insulating body and at least two electrodes. A layer sequence includes at least one electrically conductive or semiconductive layer, at least one electrically conductive layer and at least one insulating layer and is arranged at least in sub-areas on the inside of the insulating body.

20 Claims, 3 Drawing Sheets

SURGE ARRESTER

This application is a continuation of co-pending International Application No. PCT/EP2010/050864, filed Jan. 26, 2010, which designated the United States and was not published in English, and which claims priority to German Application No. 10 2009 006 543.1, filed Jan. 29, 2009, both of which applications are incorporated herein by reference.

BACKGROUND

The German patent document DE 2431236 A discloses a surge arrester.

SUMMARY OF THE INVENTION

In one aspect, a surge arrester that has a rapid response is specified.

A surge arrester is specified which comprises a preferably gas-tight housing. The housing of the surge arrester has at least one gas-filled, preferably tubular, insulating body, which has at least two electrodes. The electrodes of the surge arrester are preferably arranged at a distance from one another. A sequence of a plurality of material layers is arranged on the inside of the insulating body, at least in areas at a distance from one another or in a cohesive area, and this is referred to in the following text as a layer sequence. The layer sequence comprises at least one electrically conductive or semiconductive layer, at least one electrically conductive layer and at least one insulating layer. The electrically conductive or semiconductive layer is used to reduce the trigger voltage of the surge arrester, and is also referred to as a trigger strip.

The layer sequence of at least one electrically conductive layer, an insulating layer and at least one electrically conductive or semiconductive layer results in distortion of the electrical field which exists between the electrodes of the surge arrester. The layer sequence arranged on the inside of the insulating body therefore results in deliberate distortion and, associated with this, a significant increase in the electrical field in the area of the electrically conductive or semiconductive layer. The field distortion preferably leads to a field increase in the end areas of the electrically conductive or semiconductive layer. The end areas are preferably located at least in the vicinity of at least one electrode of the surge arrester. As a result of the layer sequence which is arranged on the inside of the insulating body, and because of the field increase in the end areas of the electrically conductive or semiconductive layer, the surge arrester has a very rapid response time.

In one embodiment, the at least one insulating layer is arranged between the electrically conductive or semiconductive layer and the electrically conductive layer. In one embodiment, the layers may also have any other possible layer sequence.

In one preferred embodiment, the insulating layer is as thin as possible, as a result of which the distance between an electrically conductive or semiconductive layer and an electrically conductive layer is as short as possible. The insulating layer preferably has a thickness of between 0.1 and 5 mm. In one preferred embodiment, the insulating layer has a thickness of less than 1 mm.

In one embodiment, the electrically conductive layer preferably has at least two sub-areas which are at a distance from one another and are arranged alongside one another at right angles to the stacking direction of the layers.

In one preferred embodiment, the sub-areas of the electrically conductive layer which are at a distance from one another are designed such that each of the sub-areas of the electrically conductive layer in each case has a preferably direct electrical contact with one of the electrodes of the surge arrester. It is also possible for the sub-areas of the electrically conductive layer to make contact with the electrodes of the surge arrester via an additional electrical conductor. The sub-areas of the electrically conductive layer are preferably at the same electrical potential as the respective electrodes with which contact is made in the surge arrester.

The at least two sub-areas of the electrically conductive layer are preferably of the same size. However, it is also possible for the sub-areas of the electrically conductive layer to be of different sizes. In one embodiment, the electrically conductive layer is applied to the insulating layer. The electrically conductive layer preferably extends over at least one surface of the insulating layer, with the electrically conductive layer being subdivided into at least two sub-areas which are isolated from one another.

In one embodiment, the electrically conductive layer is in the form of at least two cylinders which are at a distance from one another in the longitudinal direction of the surge arrester. In one embodiment, the at least two cylinders of the electrically conductive layer are applied to the outside of the insulating layer.

In another embodiment, the sub-areas can each have a different form, which is suitable for distorting the electrical field in the area of the electrically conductive or semiconductive layer.

In one embodiment, the insulating layer comprises a glass or a ceramic. The insulating layer may also comprise other suitable electrically insulating materials.

In one embodiment, the insulating layer is in the form of a cylinder.

In a further embodiment, the insulating layer may be in the form of a strip.

The layer of electrically conductive or semiconductive material is preferably used to reduce the trigger voltage of the surge arrester, and is referred to as a trigger strip. The strips preferably extend in the longitudinal direction of the surge arrester. In one embodiment, a plurality of these trigger strips can be arranged parallel to one another in the longitudinal direction of the surge arrester. The electrically conductive or semiconductive layer is preferably at a distance from the electrodes of the surge arrester, and does not make any direct electrical contact with them.

In one embodiment, the layer of electrically conductive or semiconductive material contains graphite.

In one embodiment, the greatest extent of the layer of electrically conductive or semiconductive material extends parallel to the longitudinal axis of the surge arrester.

In a further embodiment, the layer of electrically conductive or semiconductive material can also be subdivided into a plurality of areas which are at a distance from one another.

In one embodiment, the layer sequence of electrically conductive or semiconductive material, an insulating layer and a conductive layer can be applied directly to the inside of the insulating body. In this embodiment, it is advantageous for at least one electrically conductive layer to be applied directly to the inside of the insulating body. The electrically conductive layer which is arranged on the inside of the insulating body is followed by at least one layer of insulating material, which, for example, is composed of glass and/or ceramic. At least one area of electrically conductive or semiconductive material is preferably applied to at least one layer of insulating material. In a further embodiment, a plurality of areas of electrically conductive or semiconductive material which are at a distance from one another are applied to the insulating layer.

In a further embodiment, the layer sequence comprises at least one separate component which is inserted into the interior of the insulating body of the surge arrester. The external dimensions of the separate component preferably correspond to the dimensions of the interior of the arrester body.

In a further embodiment, the separate component may also consist of a plurality of assembled individual components, which are arranged individually or assembled in the interior of the insulating body.

In one embodiment, it is also possible for the at least one separately inserted component to comprise at least one electrically conductive or semiconductive layer and at least one insulating layer. In this embodiment, at least one electrically conductive layer is arranged separately on the inside of the insulating body.

In a further embodiment, the component is inserted into depressions on the inside of the insulating body, with one preferred embodiment of the depressions corresponding to the dimensions of the inserted components. In a further embodiment, the depressions may also have larger dimensions.

The electrically conductive or semiconductive layer is preferably in the form of a strip, with the trigger strip being used for field emission of charge carriers.

The trigger voltage of a surge arrester normally rises significantly with the gradient of the applied voltage ramp. It is particularly disadvantageous for the ratio of the dynamic trigger voltage to the static trigger voltage in surge arresters to have trigger voltage values below 100 V. In this case, the field emission of charge carriers from the graphite trigger strips which are normally provided is only very weak. In contrast to a surge arrester as described above, the weak field emission of charge carriers restricts the options for use, particularly in the telecommunications field. Use for lightning protection applications, in which a low static response voltage is required with a good dynamic response at the same time, is likewise restricted.

A surge arrester as described above in contrast has a very rapid response since the layer sequence which is applied to the inside of the arrester results in deliberate distortion of and a significant increase in the electrical field in the area of the trigger strips. A greater field increase is achieved in the area of the trigger strip ends by the distance between the trigger strips without any field and the electrically conductive areas being as short as possible.

BRIEF DESCRIPTION OF THE DRAWINGS

The subject matter described above will be explained in more detail with reference to the following figures and exemplary embodiments.

The drawings described in the following text should not be considered as being true to scale and, in fact, all the dimensions may be illustrated enlarged, reduced or else distorted, in order to improve the illustration. Elements which carry out the same functions as one another, or have the same function, are annotated with the same reference symbols.

Figure 1:
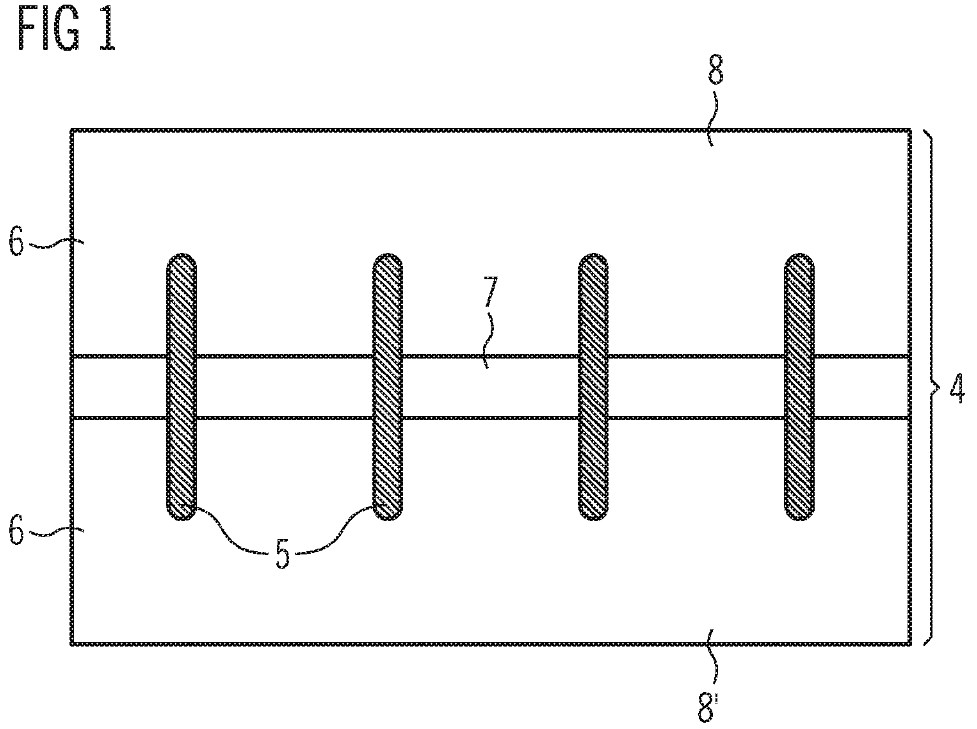
FIG. 1 schematically illustrates a development of one embodiment of a layer sequence.

The following list of reference symbols may be used in conjunction with the drawings:

Insulating body

12, 2' Electrodes

3 Inside of the insulating body 1

4 Layer sequence

5 Electrically conductive or semiconductive layer

6 Electrically conductive layer

7 Insulating layer

8, 8' Areas of the electrically conductive layer 6 at a distance from one another

9 Component

10 Depression in the insulating body 1

DETAILED DESCRIPTION OF ILLUSTRATIVE EMBODIMENTS

FIG. 1 schematically illustrates a development of one embodiment of a layer sequence 4. The layer sequence 4 comprises an insulating layer 7, to whose lower face two electrically conductive areas 8, 8' of an electrically conductive layer 6 are applied at a distance from one another. The electrically conductive areas 8, 8' extend to the respective edge of the insulating layer 7. In one embodiment, which is not illustrated, it is also possible for the electrically conductive areas 8, 8' to extend as far as or else beyond the edge of the insulating layer 7. A plurality of sections which are in the form of strips and are at a distance from one another of an electrically conductive or semiconductive layer 5 are applied to the upper face of the insulating layer 7. The sections of the electrically conductive or semiconductive layer 5 are so-called “trigger strips”. The electrically conductive or semiconductive layer 5 preferably contains graphite. In one embodiment, which is not illustrated, the “trigger strips” may also have any other suitable form or else may cover relatively large surface areas. The areas of electrically conductive or semiconductive material 5 preferably have their greatest extent in the longitudinal direction of the surge arrester. The layer sequence 4 is preferably arranged on the inside of the insulating body of a surge arrester.

Figure 2:
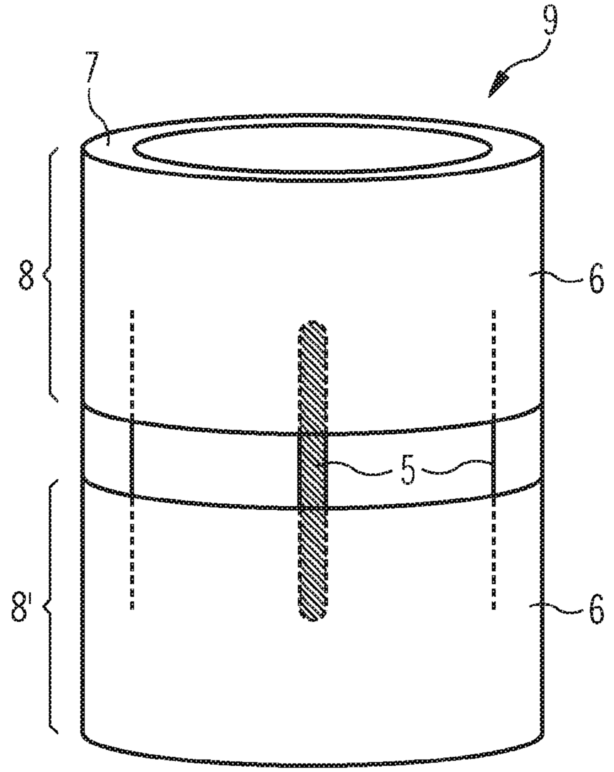
FIG. 2 schematically illustrates a component which has one exemplary embodiment of the layer sequence.

FIG. 2 shows a layer sequence 4 which is in the form of a separate component 9. In the illustrated embodiment, the component 9 has a cylindrical body. In this case, the shape of the component 9 is governed mainly by the shape of the layer 7 of insulating material. The insulating layer 7 preferably comprises at least ceramic and/or glass. In the illustrated embodiment, two areas 8, 8' of an electrically conductive layer 6 which are at a distance from one another and extend over the entire circumference of the cylindrical insulating layer 7 are applied to the outside of the insulating layer 7. In the illustrated embodiment, the areas 8, 8' which are at a distance from one another each extend to the ends of the cylinder.

In one embodiment, the electrically conductive areas 8, 8' extend to the respective end face of the cylindrical body. As a result of the electrically conductive areas 8, 8' on the end surfaces of the cylindrical insulating layer 7, the component 9 which is inserted into a surge arrester therefore preferably makes direct contact with the electrically conductive areas 8, 8' with electrodes of the surge arrester. As a result of an electrically conductive contact between the respective electrically conductive layers 8, 8' of one of the electrodes of the surge arrester, the electrically conductive layers 8, 8' are therefore preferably of the same electrical potentials as the respective electrodes of the surge arrester with which contact is made.

So-called "trigger strips" composed of electrically conductive or semiconductive material 5 are applied at a distance from one another to the inside of the insulating layer 7. In the projection, the "trigger strips" overlap the two areas 8, 8', which are at a distance from one another, of electrically conductive material 6. The illustrated component 9 is preferably intended to be inserted into the interior of a surge arrester. In this case, it is advantageous for the external diameter of the component 9 to correspond approximately to the internal diameter of the insulating body 1 of the arrester. The length of the component 9 preferably corresponds to the length of the free area available in the insulating body 1. The arrester with the insulating body 1 is not illustrated in the figure, for clarity reasons.

In a further embodiment which is not illustrated, the electrically conductive layer 6 may also be applied separately to the inside of the insulating body 1 of the arrester. In this case, the component 9 comprises the insulating layer 7 and the electrically conductive or semiconductive layer 5 in the form of the "trigger strips".

Figure 3:
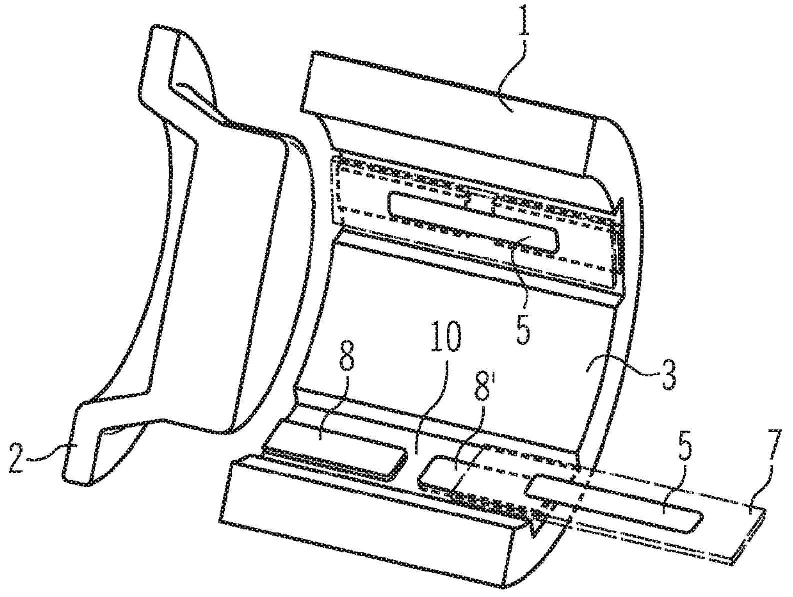
FIG. 3 illustrates an embodiment in which the layer sequence is in the form of separate strips.

FIG. 3 illustrates an embodiment of the layer sequence 4 in which the layer sequence 4 is in the form of separate strips. In the illustrated embodiment, the strips comprise at least one element in the form of a strip and composed of an insulating layer 7 with an area, which is arranged on this strip, of an electrically conductive or semiconductive layer 5 as a "trigger strip". The electrically conductive layer 6 is arranged in depressions 10 in the interior 3 of the insulating body 1 of the arrester. The insulating body 1 preferably has a plurality of depressions 10 which are at a distance from one another in a circular form. The electrically conductive layer 6 in the illustrated embodiment has two sub-areas 8, 8' which are at a distance from one another in the longitudinal direction of the arrester. The areas 8, 8' of the electrically conductive layer 6 which are at a distance from one another preferably each make direct contact with the closest electrode 2 of the surge arrester. The strips of the insulating layer 7 with the applied "trigger strips" are inserted or pushed as separate elements into the depressions 10.

In a further embodiment, which is not illustrated, the layer 6 of electrically conductive material may likewise already be applied to the inserted strip of insulating layer 7 and "trigger strip".

Figure 4:
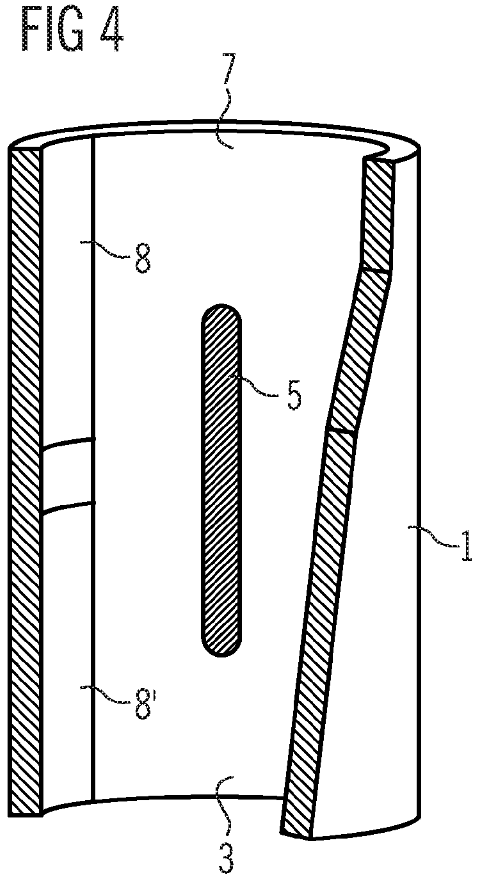
FIG. 4 schematically illustrates an embodiment in which the layer sequence is applied to the inside of an insulating body.

FIG. 4 schematically illustrates a further embodiment, in which the layer sequence 4 is applied to the inside of an insulating body 1 of the arrester. In the illustrated embodiment, the areas 8, 8' of the electrically conductive layer 6 which are at a distance from one another are applied directly to the inside of the insulating body 1. The areas 8, 8' of the electrically conductive layer 6 in the illustrated embodiment preferably extend laterally as far as the respective end areas of the insulating body 1, as a result of which a direct electrical contact is made with the electrodes of the arrester. A layer of insulating material 7 is arranged above the electrically conductive layer 6. The insulating layer 7 preferably covers the entire internal surface of the insulating body 1 of the arrester. "Trigger strips", in the form of strips of an electrically conductive or semiconductive layer 5, are applied to the insulating layer 7 in the illustrated embodiment. The "trigger strips" preferably extend in the longitudinal direction of the arrester. The "trigger strips" preferably extend so far in the longitudinal direction of the arrester that their ends at least partially overlap the areas 8, 8', with the areas 8, 8' and the "trigger strips" not making direct electrical contact with one another, because of the insulating layer 5 arranged between them.

Figure 5A:
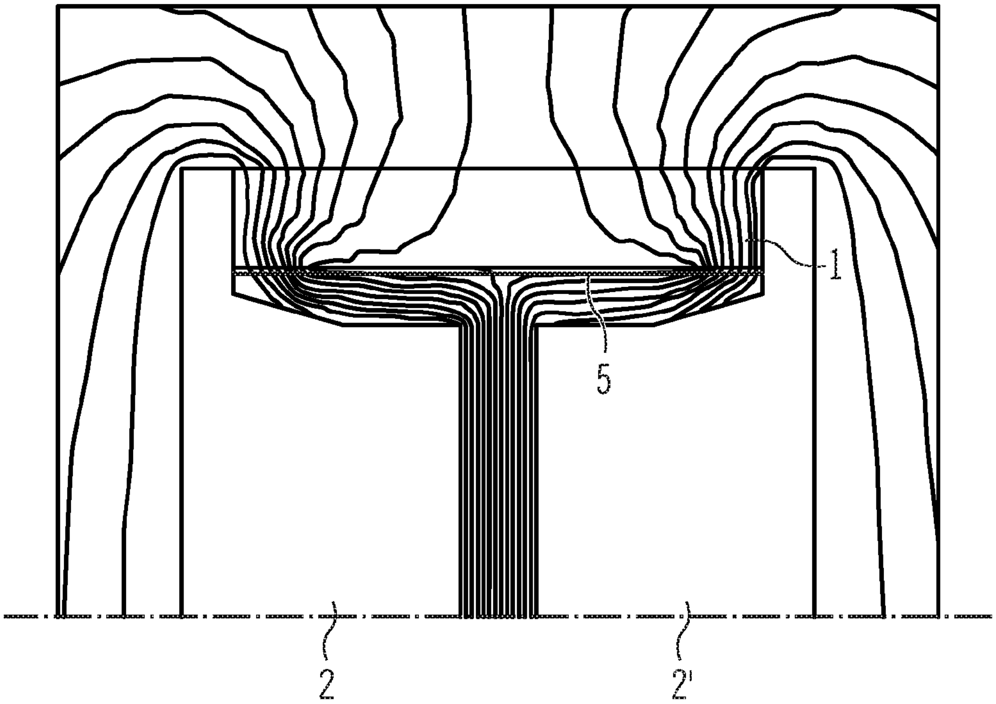
FIGS. 5*a* and 5*b* schematically illustrate the equipotential lines of the electrical field in a two-electrode surge arrester with (FIG. 5*a*) and without (FIG. 5*b*) a layer sequence.

FIG. 5*a* schematically illustrates equipotential lines of the electrical field in a two-electrode surge arrester, with a layer sequence 4 being arranged on the inside of the insulating body 1 of a surge arrester. The layer sequence 4 comprises two areas 8, 8' of an electrically conductive layer 6 which are at a distance from one another, an insulating layer 7 and an electrically conductive or semiconductive layer 5 in the form of "trigger strips". The layer sequence 4 results in the electrical field being distorted in the area of the ends of the "trigger strips". Because of this field distortion, the electrical field is increased at the ends of the "trigger strips", which is represented by the field lines of the equipotential lines being located closer to one another at the ends of the "trigger strip".

Figure 5B:
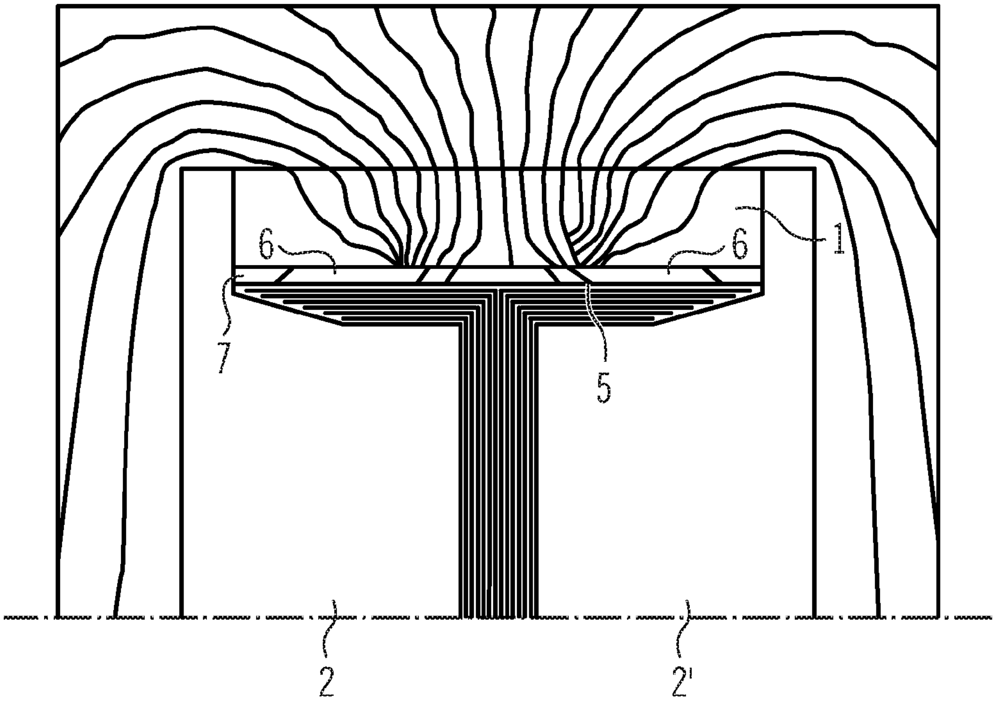

FIG. 5*b* shows equipotential lines of the electrical field in a two-electrode surge arrester, in which only one electrically conductive or semiconductive layer 5 is applied as a "trigger strip" to the inside of the insulating body 1. Because of the lack of an insulating layer and the areas of the electrically conductive layer which are at a distance from one another, there is no significant increase in the electrical field at the ends of the "trigger strips". The equipotential lines in the area of the ends of the "trigger strip" are further away from one another than the equipotential lines in FIG. 5*a*. In a conventional surge arrester, there is therefore no significant increase in the electrical field in the area of the ends of the "trigger strip".

Although it has been possible to describe only a limited number of possible developments of the invention in the exemplary embodiments, the invention is not restricted to these developments. In principle, it is possible for the individual partial layers in the layer sequence each to have a plurality of individual layers, or for the layer sequence to have a plurality of sub-areas which are at a distance from one another laterally.

The description of the subjects indicated here is not restricted to the individual specific embodiments; in fact, the features of the individual embodiments can be combined with one another as required, while this is technically worthwhile.

What is claimed is:

1. A surge arrester, comprising:

a housing which comprises a tubular insulating body with at least two electrodes, the insulating body being filled with a gas; and a layer sequence which comprises an electrically conductive or semiconductive layer that serves as a trigger strip, the layer sequence further comprising an electrically conductive layer and an insulating layer, the layer sequence arranged at least in sub-areas on an inside of the insulating body.

2. The surge arrester according to claim 1, wherein the insulating layer is arranged between the electrically conductive or semiconductive layer and the electrically conductive layer.

3. The surge arrester according to claim 1, wherein the electrically conductive layer comprises at least two areas that are at a distance from one another at right angles to a stacking direction of the layer sequence.

4. The surge arrester according to claim 1, wherein a greatest extent of the electrically conductive or semiconductive layer extends parallel to a longitudinal axis of the surge arrester.

5. A surge arrester comprising:

a housing which comprises a tubular insulating body with at least two electrodes; and a layer sequence which comprises an electrically conductive or semiconductive an electrically conductive layer and an insulating layer, the layer sequence arranged at least in sub-areas on an inside of the insulating body, wherein the electrically conductive or semiconductive layer comprises graphite.

6. A surge arrester comprising:

a housing which comprises a tubular insulating body with at least two electrodes; and a layer sequence which comprises an electrically conductive or semiconductive an electrically conductive layer and an insulating layer, the layer sequence arranged at least in sub-areas on an inside of the insulating body, wherein the insulating layer comprises glass and/or ceramic.

7. The surge arrester according to claim 1, wherein the insulating layer is in the form of a cylinder.

8. The surge arrester according to claim 1, wherein the electrically conductive layer is in the form of two cylinders which are at a distance from one another in a longitudinal direction of the surge arrester.

9. The surge arrester according to claim 1, wherein the insulating layer is in the form of a strip.

10. The surge arrester according to claim 1, wherein the inside of the insulating body is coated with the layer sequence.

11. The surge arrester according to claim 1, wherein the layer sequence is inserted as a separate component into the inside of the insulating body.

12. The surge arrester according to claim 11, wherein the separate component is inserted into matching depressions on the inside of the insulating body.

13. The surge arrester according to claim 1, wherein the electrically conductive or semiconductive layer comprises a trigger strip for field emission of charge carriers.

14. The surge arrester according to claim 1, wherein the layer sequence results in distortion of an electrical field in the surge arrester, which results in a field increase at ends of the electrically conductive or semiconductive layer.

15. The surge arrester according to claim 1, wherein the surge arrester has a rapid response time because of the layer sequence that is arranged on the inside of the insulating body.

16. The surge arrester according to claim 1, wherein the surge arrest is configured to operate such that when a voltage difference between the electrodes exceeds a breakdown voltage, a spark is formed inside the gas-filled insulating body thereby reducing electrical resistance.

17. The surge arrester according to claim 16, wherein the electrically conductive or semiconductive layer is configured to reduce a trigger voltage of the surge arrester.

18. The surge arrester according to claim 1, wherein the electrically conductive or semiconductive layer comprises graphite.

19. The surge arrester according to claim 1, wherein the insulating layer comprises glass and/or ceramic.

20. The surge arrester according to claim 1, wherein the layer sequence is arranged only in sub-areas on an inside of the insulating body.

* * * * *

UNITED STATES PATENT AND TRADEMARK OFFICE

CERTIFICATE OF CORRECTION

PATENT NO. : 8,508,904 B2
APPLICATION NO. : 13/194256
DATED : August 13, 2013
INVENTOR(S) : Gero Zimmermann It is certified that error appears in the above-identified patent and that said Letters Patent is hereby corrected as shown below:

In the Claims:

In Col. 7, line 2, claim 5, after "semiconductive" insert --layer,--.
In Col. 7, line 11, claim 6, after "semiconductive" insert --layer,--.
In Col. 8, line 15, claim 16, delete "arrest" and insert --arrester--.

Signed and Sealed this
Twenty-second Day of October, 2013

Teresa Stanek Rea
*Deputy Director of the United States Patent and Trademark Office*